United States Patent [19]
Butterfield, Jr. et al.

[11] 3,948,871

[45] Apr. 6, 1976

[54] COMPOSITION FOR HARD TYPE CONTACT LENS WITH WETTABLE SURFACE

[75] Inventors: George H. Butterfield, Jr., Portland, Oreg.; George H. Butterfield, Sr., deceased, late of Portland, Oreg.; by David Gordon, executor, Portland, Oreg.

[73] Assignee: George H. Butterfield and Son, Portland, Oreg.

[22] Filed: Feb. 4, 1974

[21] Appl. No.: 439,407

Related U.S. Application Data

[63] Continuation of Ser. No. 246,453, April 21, 1972, abandoned.

[52] U.S. Cl. ............... 260/86.1 E; 264/1; 351/159
[51] Int. Cl.² ........................................ C08F 15/16
[58] Field of Search .................... 260/86.1 E; 264/1

[56] References Cited

UNITED STATES PATENTS

| | | | |
|---|---|---|---|
| 2,484,487 | 10/1949 | Caldwell | 260/86.1 E |
| 3,172,868 | 3/1965 | Jefferson | 260/86.1 E |
| 3,691,263 | 9/1972 | Stoy et al. | 260/86.1 E |

OTHER PUBLICATIONS

Yasuda et al., Chem. Abs. 70, (1969), p. 29488W.

*Primary Examiner*—Harry Wong, Jr.
*Attorney, Agent, or Firm*—Oliver D. Olson

[57] ABSTRACT

A contact lens of the hard type, but exhibiting wettable surface characteristics, is produced from a polymer composition consisting essentially of about 90% by weight methyl methacrylate and about 10% by weight of neutralized hydroxy ethyl methacrylate.

4 Claims, No Drawings

COMPOSITION FOR HARD TYPE CONTACT LENS WITH WETTABLE SURFACE

CROSS REFERENCE TO RELATED APPLICATION

This application is a continuation of the earlier filed co-pending application Ser. No. 246,453, filed Apr. 21, 1972 and now abandoned.

BACKGROUND OF THE INVENTION

This invention relates to contact lenses, and more particularly to a contact lens of the rigid type which exhibits wettable characteristics.

Contact lenses of the hard type are characterized generally by a relatively rigid structure. They have good optical properties and may be provided in a wide range of precise optical specifications. However, heretofore they have presented a number of problems and disadvantages to the wearer, primarily because of their hydrophobic surface characteristics. Thus, because they do not wet adequately with tears, they may cause eyelid irritation, eye abrasion, edema, spectacle blur and corneal distortions.

Because of the foregoing problems, recent efforts have been directed to the development of soft contact lenses. Such lenses are hydrophilic in character and thus are readily wet by tears and hence less irritating to the eyes. In fact, the degree of comfort is such that they often are worn too long, resulting in corneal edema and other adverse effects. Their optical properties are rather poor, however, varying unpredictably with variations in such factors as hydration during storage and use, thereby contributing adversely to reduced visual acuity. Also, they are usable only in the low ranges of optical corrections. Moreover, verification of lens specification is extremely difficult, whereby to seriously reduce the possibility of successful fitting and reproducibility of physical and optical parameters. Still further, they are quite vulnerable to contamination by fungi and bacteria, to such extent that unless maintained sterile during storage and use, serious eye infections may result.

SUMMARY OF THE INVENTION

In its basic concept, the contact lens composition of this invention provides a wettable hard type lens and is produced from a polymer consisting essentially of about 85% to about 95% by weight of methyl methacrylate and about 5% to about 15% by weight of hydroxy ethyl methacrylate, preferably neutralized before mixing with the methyl methacrylate component.

It is by virtue of the foregoing basic concept that the principal objective of this invention is achieved; namely, to overcome the aforementioned problems and disadvantages associated with prior contact lenses of both hard and soft types.

Another important object of this invention is to provide a contact lens of the class described which may be installed in the eye without prior use of wetting agents, since it is wetted immediately by tears.

A further important object of this invention is to provide a contact lens of the class described which has a substantially neutral pH and thus is rendered compatible with the human eye, allowing it to be worn for extended periods of time without adverse effect.

Still another important object of this invention is to provide a polymerized composition from which contact lenses of the class described may be produced by the use of conventional manufacturing machinery and procedures.

The foregoing and other objects and advantages of this invention will appear from the following detailed description of a preferred embodiment.

DESCRIPTION OF THE PREFERRED EMBODIMENT

The composition of this invention from which improved wettable contact lenses of the hard type are manufactured, results from the copolymerization of about 85–95%, preferably about 90%, by weight of methyl methacrylate and about 5–15%, preferably about 10%, by weight of hydroxy ethyl methacrylate.

It has been found that less than about 5% by weight of hydroxy ethyl methacrylate provides a contact lens with insufficient wettable properties. On the other hand, it has also been found that greater than about 15% by weight of hydroxy ethyl methacrylate produces a contact lens having excessive water absorption and swelling, with corresponding reduction in optical properties and lens specification verification.

It has also been found that the composition of this invention may be provided with a substantially neutral pH, whereby contact lenses manufactured therefrom are rendered compatible with the human eye, thereby permitting them to be worn for extended periods of time without adverse effect. This is achieved, in the present invention, by neutralizing the hydroxy ethyl methacrylate component prior to reacting it with the major component. Although various neutralizing agents may be employed for this purpose, including the alkali metal hydroxides and alkaline earth bases and mixture thereof, the preferred neutralizing agent is calcium hydroxide. It has been found that neutralization between pH 6.5 and pH 8.5 is quite satisfactory.

The neutralized hydroxy ethyl methacrylate is distilled for purification. The resulting prepolymer syrup differs from un-neutralized hydroxy ethyl methacrylate. The latter gels readily when directly distilled and hydrolyzes to produce acidic components. The neutralized hydroxy ethyl methacrylate produced in accordance with this invention is free of acids, inhibitors and other undesirable by-products. Apparently, treatment with calcium hydroxide or other neutralizing agent modifies the structure of hydroxy ethyl methacrylate by increasing the number of glycol linkages to produce longer polyol chains. In any event, it is this neutralization treatment that enables the grading of the texture of contact lenses produced from the composition, whereby precisely to control their use on a more individualized basis.

The neutralized hydroxy ethyl methacrylate is reacted with the methyl methacrylate component to effect copolymerization. This reaction is enhanced by the use of an appropriate catalyst, such as 2, 5, dimethyl ethyl hexanol peroxide, terbutylperoctoate, and others equally well known in the art.

In carrying out the copolymerization reaction, the mixture of methyl methacrylate, neutralized hydroxy ethyl methacrylate and catalyst is contained in a suitable sterile mold and subjected to polymerization by any of the well known oven or autoclave techniques. Such techniques are exemplified in such publications as "Embedding Specimens in Methacrylate Resins", by Rohm and Haas Company; "Lucite Acrylic Resins Embedment And Casting Techniques", publication A-61078 (6-68) of E. I. DuPont de Nemours & Co., Inc.; and "Embedding With Methacrylates", data sheet No. 104 of Polysciences, Inc.

In general, oven polymerization involves heating the mold to about 35°–40°C. for several days. If desired, this may be followed by heating to about 107°C. for about two hours. Autoclave polymerization involves placing the mold in an autoclave, evacuating the latter of air and then pressurizing it with carbon dioxide or nitrogen to about 35–150 psi, then heating it to about 72°–135°C until polymerization is complete. If the curing temperature is below about 107°C, final curing should be completed by heating to about 107°C. for about two hours.

The resulting rods are either stored in glass to prevent contamination, or are cut into blanks and packaged for distribution and further processing into finished lenses.

Contact lenses produced from the composition described hereinbefore combine the beneficial qualities of both hard and soft type lenses provided heretofore, while eliminating all of the adverse effects thereof. Thus, the lens is relatively rigid, and therefore may be contoured for precise fit; it is hygroscopic to the degree that it may be installed in the eye without prior use of wetting agents, since it is wetted immediately upon contact by tears; however, its water absorption is substantially the same as methyl methacrylate and thus the extent of dimensional change is reduced to a minimum with corresponding maintenance of optimum optical properties and of lens specification; and the possibility of contamination by fungi and bacteria is minimized.

It will be apparent to those skilled in the art that various changes may be made in the number, type and proportions of ingredients, within the limits described hereinbefore, without departing from the spirit of this invention.

Having now described our invention and the manner in which it may be used, we claim:

1. A contact lens composition consisting essentially of the polymerization product of from about 85% to about 95% by weight of methyl methacrylate and from about 5% to about 15% by weight of hydroxy ethyl methacrylate, the hydroxy ethyl methacrylate being substantially neutralized to a pH of between about 6.5 and about 8.5 prior to combining with the methyl methacrylate.

2. The contact lens composition of claim 1 wherein neutralization of said hydroxy ethyl methacrylate is achieved by reaction with at least one of the materials selected from the group consisting of alkali metal hydroxides and alkaline earth bases.

3. The contact lens composition of claim 1 wherein the polymerization product contains about 90% by weight of methyl methacrylate and about 10% by weight of hydroxy ethyl methacrylate.

4. The contact lens composition of claim 3 wherein the hydroxy ethyl methacrylate is neutralized with calcium hydroxide to a pH of between about 6.5 and 8.5 prior to combining with the methyl methacrylate.

* * * * *